United States Patent [19]

Suginoya et al.

[11] Patent Number: 4,704,559
[45] Date of Patent: Nov. 3, 1987

[54] MATRIX TYPE MULTI-COLOR DISPLAY DEVICE

[75] Inventors: Mitsuru Suginoya; Koji Iwasa; Hitoshi Kamamori; Yutaka Sano; Yumiko Terada, all of Tokyo, Japan

[73] Assignee: Seiko Instruments & Electronics Ltd., Japan

[21] Appl. No.: 903,908

[22] Filed: Sep. 4, 1986

Related U.S. Application Data

[63] Continuation of Ser. No. 834,146, Feb. 25, 1986, abandoned, which is a continuation of Ser. No. 632,487, Jul. 19, 1984, abandoned.

[51] Int. Cl.⁴ .............................................. G02F 1/13
[52] U.S. Cl. ................................... 315/169.1; 204/42; 315/169.3; 340/784; 350/334; 350/339 F
[58] Field of Search ........................... 315/169.1, 169.3; 204/42; 340/784; 350/334, 339 F

[56] References Cited

U.S. PATENT DOCUMENTS

| 3,832,034 | 8/1974 | Edmonds | 350/339 F |
| 4,103,297 | 7/1978 | McGreivy et al. | 340/784 |
| 4,410,887 | 10/1983 | Stolov et al. | 350/339 F |
| 4,421,610 | 12/1983 | Rodriguez | 204/42 |

FOREIGN PATENT DOCUMENTS 56-25714 12/1981 Japan ................................. 350/339 F

OTHER PUBLICATIONS

Full Colormatrix Liquid Crystal Display—by Uchida et al. IEEE Transactions on Electron Devices, vol. ED-30, No. 5, May 1983, pp. 503–507.

Primary Examiner—Harold Dixon
Attorney, Agent, or Firm—Bruce L. Adams; Van C. Wilks

[57] ABSTRACT

A liquid crystal matrix type multi-color display is provided incorporating transistor structure and wherein the display electrodes are energized from the transistor drain circuit in an electroplating both to coat and color the display electrodes.

2 Claims, 7 Drawing Figures

MATRIX TYPE MULTI-COLOR DISPLAY DEVICE

This is a continuation of application Ser. No. 834,146 filed Feb. 25, 1986, which in turn is a continuation of application Ser. No. 632,487, filed July 19, 1984, both now abandoned.

BACKGROUND OF THE INVENTION

This invention relates generally to a matrix type multi-color display device and to a method of producing color filters in a matrix type multi-color display device using thin film transistors (TFT) and color filters.

A matrix type multi-color display device using TFTs, as shown in FIG. 1, has been proposed conventionally. In this device, thin film transistors 1 are arranged in a matrix in such a manner that their gate electrodes 7 are connected in rows to row drivers $R_1$-$R_n$ while their source electrodes 12 are connected in columns to column drivers $C_1$-$C_n$, and color filters 2 of different colors are provided over the display electrodes 13 connected to drain electrodes 14 of the transistors. Some display material 3 which operates as an optical shutter when a voltage is applied thereto, such as a liquid crystal or an electrochromic material, is interposed between each display electrode 13 and counter electrode 5 connected to the ground, and a capacitor 4 is connected between each display electrode 13 and either ground or the gate electrode connected to the row driver of the preceding stage. There is a delay between the application of an electric signal across the display material and the change in optical characteristics at that point, so the capacitors 4 are provided to extend the time in which the signal voltage is held across the display material to at least its relaxation time, and thus let the display material respond to the signal. Each transistor 1 provides a threshold value therefor.

FIG. 2 shows a section through the matrix type multi-color display device of the construction described above. First, two substrates 6 and 11 are prepared. One of the substrates 6 has a transparent counter electrode 5 over its entire surface and the other 11 is provided with a plurality of gate electrodes 7 made of Cr of Al, a gate electrode pad 8 connected to each gate electrode 7, an insulation layer 9 of SiO or $Al_2O_3$ over the pads 8, and a semiconductor layer 10 of CdSe or CdS. Source lines 12 of Al are formed on top of the semiconductor layer 10 in the direction at right angles to the gate electrodes 7, and a display element cell is formed at each interection of the column and row lines. A display electrode 13 for each display element cell consists of a transparent conductive layer and is connected to a drain electrode 14. The display electrode 13 not only serves as a display electrode but also forms one electrode of a capacitor 4 together with the gate electrode pad 8 of the adjacent transistor. A color filter layer 2 is formed on each display electrode 13, and display material 3 fills the space between the substrate 6 and the substrate 11. In the matrix type multi-color display device of this kind, a voltage is applied between specific row and column lines to turn on a selected transistor so that a voltage is applied across the display material, the optical shutter is operated, and the color of the selected color filter is displayed. Thus, a multi-color display device which can be matrix-driven can be obtained by changing the colors of the color filters of each display element cell.

A multi-color display using color filters is extremely effective because the method is easy and simple to practice, any colors can be obtained, and various display materials and systems can be combined.

When manufacturing this multi-color display device using color filters, however, the pattern of display electrodes and the pattern of color filters formed on the surface of the display electrodes must be arranged so that there is no discrepancy between them. Particularly when making a color graphic display using a fine pattern of the three primary colors, there is the serious problem that it is very difficult to form the display electrodes and color filters without any discrepancy between them. Changing colors to reaize a multi-color display is another problem which makes the production process complicated. Particularly when the coloring is effected by the use of dyes, resist printing steps must be included to prevent the portions that have already been dyed from being dyed again in subsequent dyeing steps, making the production process all the more complicated. In addition, the resist printing technique itself presents difficult problems which must be solved independently.

To produce the color filters, methods using screen printing, photolithography and the like are generally used. Resist printing is not necessary when using screen printing but there is a limit to the miniaturization of the pattern that can be produced, so that the greater the number of the colors in the display, the lower the accuracy of the print position and thus the greater the discrepancy from the display pattern. Photolithography can provide a fine pattern, but a photolithographic step is necessary for each change of color and resist printing must be provided between dye steps, to prevent double dyeing. Thus, the production process become complicated, and the advantage of a simple means of realizing a multi-color display can no longer be obtained.

SUMMARY OF THE INVENTION

The present invention is directed to providing a method of producing a matrix type multi-color display device using rigid color filters which is simple, is not prone to pattern discrepancy even when the display pattern is fine, and eliminates the necessity of specific resist printing for each change of color. To accomplish this object, the present invention produces color filters by the use of each display electrode 13 as an electrodeposition electrode, and electrodepositing a colored layer from a solution in which are dispersed polymers and dyes which are barely soluble or insoluble in water.

In accordance with the method of the present invention, a polymer and dye can be selectively electrodeposited onto display electrodes to which a voltage is applied, and a colored layer devoid of pattern discrepancy can be formed by shaping the display electrode into a desired pattern by vacuum deposition using a mask, sputtering or etching. Several colors can be easily obtained by repeating this procedure, because no new colored layer is formed over portions which have already been electrodeposited.

If the display electrode is selected by applying the voltage to row line and the column line, the voltage can be applied to the selected display electrode from the column line via source electrode 12 and drain electrode 14, and the selective electrodeposition of the colored layer to the selected display electrode can be easily effected.

DETAILED DESCRIPTION OF THE INVENTION

Figure 1:
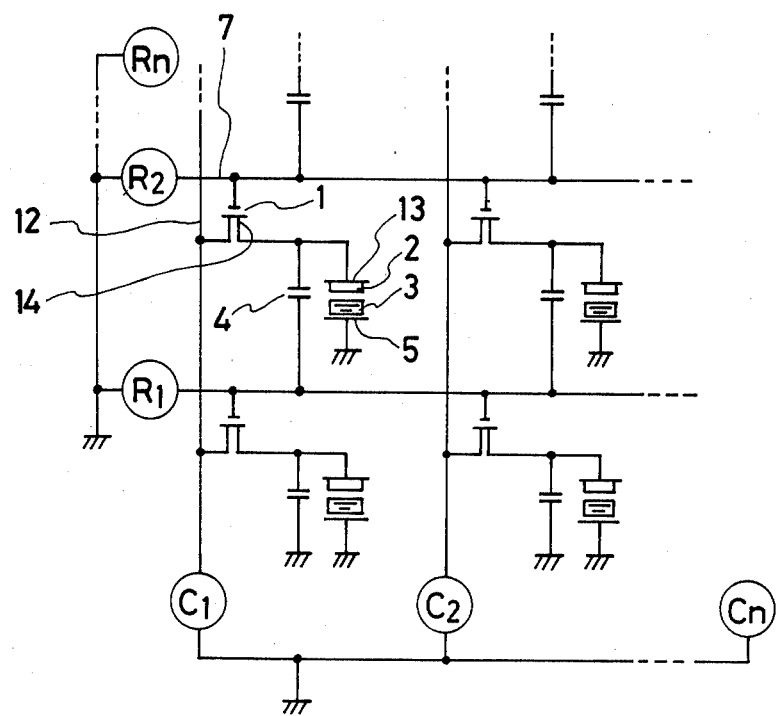
FIG. 1 is a circuit diagram of the driving circuit for a conventional matrix type multi-color display device.
Figure 2:
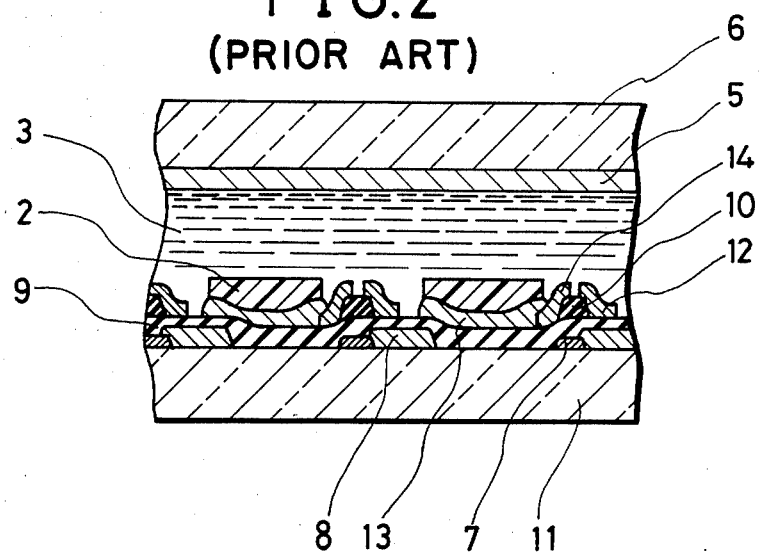
FIG. 2 is a partial, sectioned view of the conventional matrix type multi-color display device.

Hereinafter, the method of forming a colored layer by the electrodeposition of a polymer, which is the essential feature of the invention, will be described.

A method of electrochemically polymerizing a monomer on an electrode is one of the methods by which a polymer can be electrodeposited on the electrode. As one example of this method, a method by which various vinyl compounds are electrochemically polymerized on an iron sheet to obtain polymer films has been reported (Metal Surface Technology, Vol. 19, No. 12, 1968). Recently, much research has been done on the formation of a conductive polymer such as polypyrrole or polythienylene by electrochemically polymerizing a pyrrole, or thiophene or the like. However, these direct methods of electrochemically polymerizing a monomer are not yet suitable for use in the present invention because their efficiency is still low, the resultant film is already colored, and the coloring can not be done as required. Another method of electrodepositing a polymer onto an electrode involves making the polymer insoluble and precipitating onto the electrode from a polymer solution. As one example of such a method, the so-called "electrodeposition coating" is known industrially, in which a pigment is dispersed in an aqueous polymer solution, a piece of metal is dipped into the solution to act as an electrode, and a colored layer is electrodeposited onto the metal. This method is used for coating the bodies of automobiles. According to the principle of this method, a hydrophilic group such as a carboxyl group is introduced into the polymer and the carboxyl group is neutralized and made water-soluble by an inorganic alkali, an organic amine or the like. An electrode is then dipped into the aqueous solution of the polymer, which is now water-soluble, and when a voltage is applied, the carboxyl anions that have been dissociated in the aqueous solution move by electrophoresis towards the anode and react on the electrode with the protons generated by the electrolysis of water, so that the polymer is made insoluble and precipitates. In other words, the reaction expressed by the following formula occurs on the anode, and precipitation of the polymer can be observed:

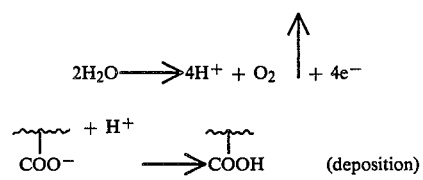

This deposition of the polymer can be observed on the cathode, conversely, if a basic group (such as a polyamine) is used as the hydrophilic group, and it is neutralized and made water-soluble by an acid.

If the polymer thus electrodeposited is electrically dielectric, it is believed that the electrode will be coated with the polymer and the current decrease, thus preventing any further growth of the coating so that no increase in the film thickness can be expected. In practice, however, a complete coating during the initial stages is prevented by bubbles of nascent oxygen resulting from the electrolysis of the water, and a film of a certain thickness can be obtained before an insulating layer is formed. With electrodeposition coating, an impressed voltage of 100 to 200 V is generally used to obtain a 10 to 20 $\mu$m-thick film. In the color filter in accordance with the present invention, however, the thinner the colored layer, the better. Accordingly, the resin concentration, the voltage and the solvent composition must be set to optimum values as is described in the examples below. Due to the effect provided by electro-osmosis, the resultant film has a low water content and is a uniform film with a higher bondability than any film prepared by coating, etc.

Examples of polymers for the anionic electrodeposition include adducts of natural dry oils and maleic acid, alkyd resins into which carboxyl groups are introduced, adducts of epoxy resins and maleic acid, polybutadiene resins into which carboxyl groups are introduced, copolymers of acrylic or methacrylic acid and their esters, and the like. Depending upon the properties of the electrodeposited film, other polymers or organic compounds with functional groups can sometimes be introduced into the polymer structure. When light is observed through a color filter, as in the present invention, the colored layer must be transparent and an acrylic or polyester type of polymer is suitable for this purpose. The number of hydrophilic groups such as carboxyl or hydroxyl groups added to the polymer is important. If there are too many, the electrodeposited layer will not be sufficiently insoluble and the resultant film will be non-uniform. On the other hand, if there are too few, the water solubility during neutralization will not be sufficient.

Although the solvent for the polymer consists principally of water, it also contains a hydrophilic polymerization solvent for the polymer such as isopropanol, n-butyl alcohol, t-butyl alcohol, methyl Cellosolve, ethyl Cellosolve, isopropyl Cellosolve, butyl Cellosolve, diethylene glycol methyl ether, diethylene glycol ethyl ether, diacetone alcohol, and the like. The type and quantity of hydrophilic solvent added also greatly affect the film thickness and the uniformity of the resultant electrodeposited layer.

When electrodeposition coating using a pigment is used as the coloring method, the charged pigment moves by electrophoresis together with the polymer and is taken up into the resultant film. In a transparent color filter such as that of the present invention, however, the obscuring effect of the pigment is not required, and when the film is thin, its tinting strength is low. Accordingly, the present invention devises a method of electrodepositing a dye together with a polymer. To electrodeposite a dye with a polymer, it is necessary to charge the dye molecules to cause electrophoresis. With a water-soluble dye, the dissociated dye ions provides an effect which is similar to that obtained by the addition of a support base, the result being an increase in the current and film thickness, and the non-uniformity of the film. Dyes which are barely soluble or are insoluble in water generally clump together in water, but since the electrodeposited polymer can be considered to be a certain kind of soap containing both hydrophobic and hydrophilic groups, it has the effect of dispersing the organic dye molecules to some extent. It has thus been found that when combined with a suitable dispersion solvent, the dye becomes fine particles which can be electrodeposited with the polymer. In this case, the rate of electrodeposition of the dye must be similar to that of the polymer, but this can be controlled by the solvent composition.

Hereinafter, the method of producing a matrix type multi-color display device using color filters, in accordance with the present invention, will be explained in detail.

EXAMPLE 1

Figure 3:
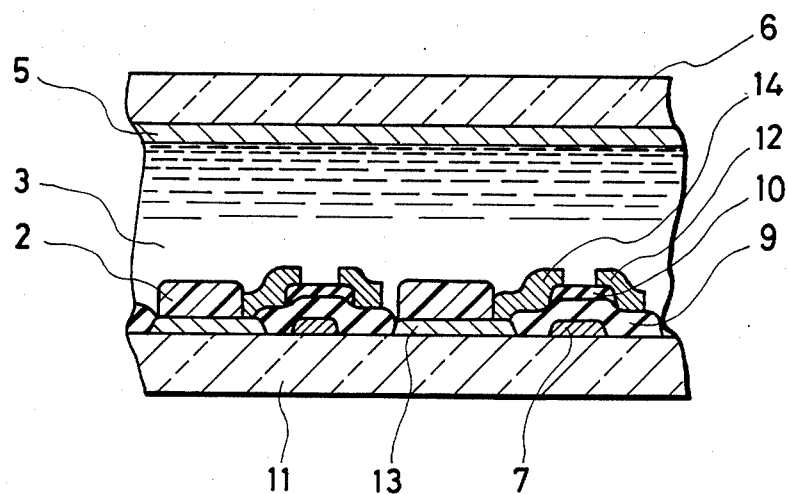
FIGS. 3 and 5 are partial, sectioned views of matrix type multi-color display devices in accordance with the present invention.
Figure 4:
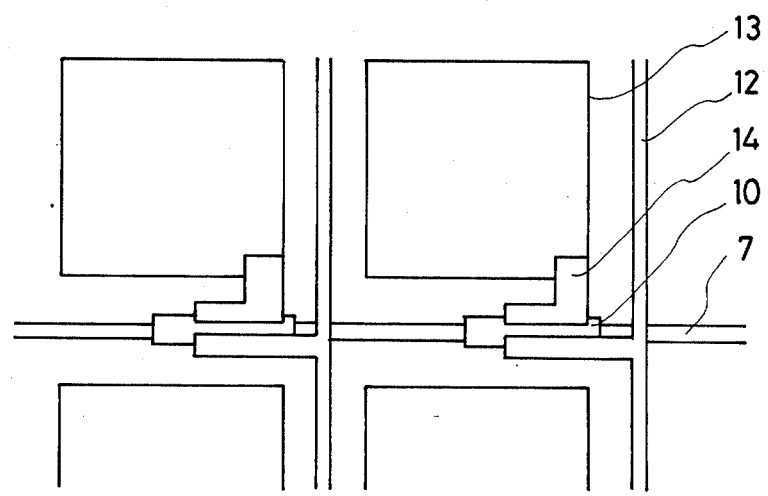
FIGS. 4, 6 and 7 are plan views of the structure of the circuit of matrix type multi-color display devices according to the present invention.

FIGS. 3 and 4 illustrate an example of the matrix type multi-color display device to which is applied the method of producing the color filter in accordance with the present invention.

(1) Manufacture of TFT substrate

Reference numeral 11 represents a glass substrate. Gate electrodes 7 of Cr, Al or the like and display electrode 13 made of transparent conductive layers of tin oxide, indium oxide or the like are formed on the substrate 11. An insulating layer 9 of silicon nitride, $SiO_2$ or the like and a semiconductor layer 10 of polysilicon or the like are sequentially laminated over each gate electrode 7, and source electrode 12 of Al or the like are formed. A drain electrode 14 of Al or the like is brought into contact with each display electrode 13. The gate electrode 7 is connected to row line. The source electrode 12 is connected to column line.

A method of producing a color filter by electrodeposition on the TFT substrate produced in the manner described above will now be explained in detail.

(2) Electrodeposition step

An electrodeposition bath of the composition tabulated below is prepared using a paint ("S-via ED-3000", a product of Jinto Paint) of the following composition:

| "S-Via ED-3000" | |
|---|---|
| Water-soluble polyester resin | 70% by weight |
| Water-soluble malamine resin | |
| Butyl Cellosolve | 30% by weight |
| Ethyl Cellosolve | |
| n-butanol | |

| Electrodeposition bath | |
|---|---|
| Materials | Weight ratio |
| S-Via ED-3000 | 8 |
| Water | 120 |
| Methyl Cellosolve | 12 |
| Oil-soluble dye | x |

The oil-soluble dyes used are limited to those which are soluble in a hydrophilic solvent. They preferably have a metal complex salt structure which is extremely light-fast. An example of such a dye has the following molecular structure ("Aizen Spilon", "Cleosol Fast" and similar trade names):

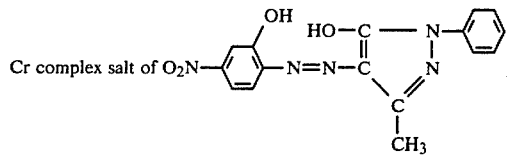

Color index No. Solvent Red 8

The bath is prepared in the following manner. First the S-Via ED-3000 is dissolved in water, and the dye is dissolved in the methyl Cellosolve. In this instance, the dye weight ratio x is selected to be within a range which does not exceed the solubility of the dye in methyl Cellosolve. The methyl Cellosolve in which the dye is dissolved in added to the above aqueous solution so that the dye is uniformly dispersed. In this case, the methyl Cellosolve acts as a dispersion medium, but when a large quantity is added, or when there is a large number of carbon atoms in the alkyl group of the Cellosolve, the resultant film will be thick and non-uniform.

The substrate 11 onto which TFTs are formed is then dipped into the electrodeposition bath prepared in the manner described above. Gate and source voltages are applied selectively to the gate electrode 7 and the source electrode 12 respectively so that the source voltage is applied to the drains 14 which are connected to the display electrode 13 corresponding to the picture elements which are to be dyed the same color, and the selected transistors are turned on. After the current has passed for several minutes, the electrodeposition is completed. The substrate is removed and washed in water to remove excess solution. A very transparent colored filter 2 can thus be formed on the selected display electrodes on the TFT substrate.

(3) Curing step

Next, the polyester and melamine resins in the colored filters 2 formed by electrodeposition are subjected to a condensation reaction by baking and are cured. When this baking is effected at 175° C. for 30 minutes in air, the colored layers are completely cured.

The colored layers thus cured become completely insulating layers. Even when they are immersed again and a current is passed through them, no re-electrodeposition or double dyeing occurs. When forming the second and subsequent differently colored filters, display electrodes which are to be dyed the same color, but are different from the previous layers, are selected by applying the gate voltage and source voltage to the selected gate electrode and source electrode respectively, and the substrate is again dipped into an electrodeposition bath in which a dye of a different color is dispersed, followed by a repetition of the electrodeposition and curing.

In the example described above, red, blue and green color filters whose transparent conductive layers for the electrodeposition are 200 μm square could be obtained by following the simple procedure of the production of a TFT substrate, electrodeposition of red filters, a curing step, electrodeposition of blue filters, a curing step, electrodeposition of green filters, and a curing step. The resultant filter was free from color discrepancies, was uniform and was resistant to the effects of acids, alkalis, various organic solvents, and hot water. The metal complex salt dyes used, were extremely stable within the colored layers. After a carbon arc light-fastness test of 360 hours, the display exhibitied a value at least 95% of its initial absorbancy, and had an excellent light-fastness.

In this manner, color filters 2 are formed on the TFT substrate, and a matrix type of multi-color liquid crystal display cell is produced by inserting a twisted nematic liquid crystal as display material 3 between a glass substrate 6 provided with a completely transparent conductive film 5 and the substrate 11. In this case, voltages which turn on the transistors are sequentially applied to the gate electrode 7 and source electrode 12, so that a multi-color matrix display becomes possible. The display electrode 13 which are connected to the turned-on transistors display the color of the color filter when the cell is interposed between a polarizer with a parallel axis of transmission and an analyzer, while the portions connected to the turned-off transistors are black. Although simple, the method of producing the matrix type multi-color display device of this embodiment can provide color filters which have a fine pattern without reducing the display quality, and is found suitable for providing a matrix-driven type of color graphic display device which is very reliable.

EXAMPLE 2

Figure 5:
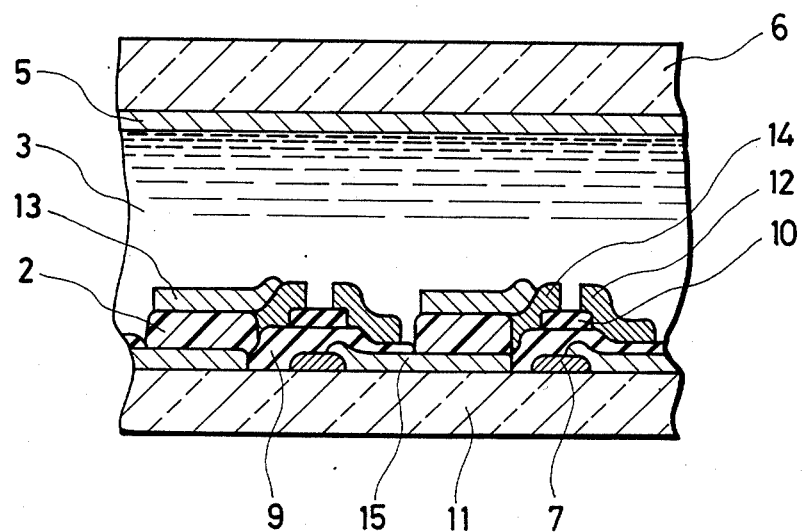
Figure 6:
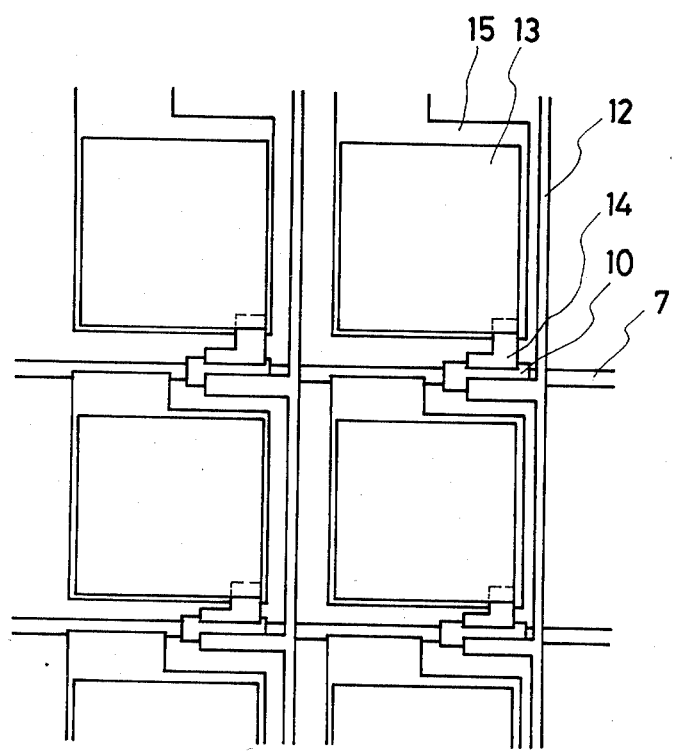

FIGS. 5 and 6 illustrate another matrix type multi-color display device in accordance with the method of the present invention.

(1) Manufacture of TFT substrate

Reference numeral 11 represents a glass substrate, and gate electrode 7 of Cr, Al or the like are formed on the substrate. Transparent conductive layers 15 for electrodeposition of tin oxide, indium oxide or the like is formed so as to come into contact with the gate electrode 7. Insulating layers 9 of silicon nitride or the like are formed over the gate electrode 7. A semiconductor layer 10 of amorphous silicon or the like, a drain electrode 14 and a source electrode 12 are formed on each insulating layer 9.

(2) Electrodeposition step

The TFT substrate is dipped in the electrodeposition bath of Example 1 and a positive (+) voltage is applied to selected gate electrodes 7. The transparent conductive layers 15 connected to these gate lines becomes anodes, and color filters 2 of the same colored layer are electrodeposited onto the transparent conductive layers 15 for electrodeposition connected to the gate electrodes 7 to which the voltage is applied. The following steps are carried out after washing the substrate 11 with water.

(3) Curing step

Same as the curing step of Example 1.

(4) Production of display electrode

A transparent display electrode 13 of tin oxide, indium oxide or the like is formed on each color filter 2, and is connected to the drain electrode 14 connected to the adjacent transistor.

In this example, red, blue and green color filters, of whose transparent conductive layers for the electrodeposition are 200 μm square could be sequentially produced by following the simple procedure of the production of a TFT substrate, electrodeposition of red filters, a curing step, electrodeposition of blue filters, a curing step, electrodeposition of green filters, a curing step, followed by the production of a display electrode, for each gate line. Thereafter, a matrix type multi-color display device was produced in the same way as in Example 1.

In addition to the effects described for example 1, this example provides the following advantages. First, since the color filters 2 are positioned below the display electrodes 13, no voltage drop occurs across the color filter layers, the voltage driving the liquid crystal can be reduced, and since the color filter layers 2 are between the gates 7 and drains 14 of adjacent transistors, as shown in the circuit diagram of FIG. 1, they act as capacitors 4 for mitigating the response. However, the colored filters 2 connected to the common gate electrode 7 are of the same color, so that freedom of color disposition is small.

EXAMPLE 3

Figure 7:
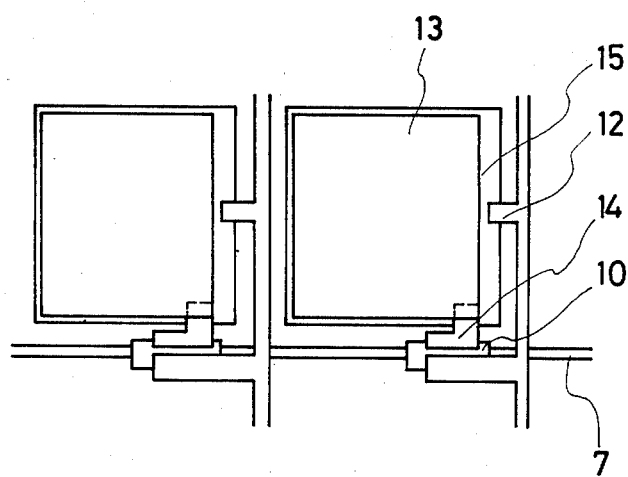

As shown in FIG. 7 a matrix type multi-color display device was produced by connecting the transparent conductive layers 15 for electrodeposition to the source electrode 12 instead of to the gate electrode 7, and then applying the electrodeposition voltage to the source electrode to produce a display device in which the lines along the common source electrode had the same color, as in Example 2. Substantially the same effects as those of Example 2 could be obtained.

EXAMPLE 4

An electrodeposition bath of the composition tabulated below is prepared using the paint ("POWERMITE 3000-10", a product of Nippon Paint) having the following composition:

| POWERMITE 3000-10 | |
|---|---|
| Water-soluble acrylic resin | 60% by weight |
| Water-soluble melamine resin | |
| Butyl Cellosolve | 40% by weight |
| Isopropyl alcohol | |

| Electrodeposition bath | |
|---|---|
| Materials | Weight ratio |
| POWERMITE 3000-10 | 10 |
| Water | 120 |
| Ethylene glycol | 20 |
| Dispersion dye | x |

The dispersion dyes used preferably do not contain and dispersant because commercially available dyes mostly contain anionic dispersants which change to ions in the bath and result in an increase in the current. The bath is mixed by uniformly dispersing the dispersion dye in the ethylene glycol, within the range of $x<1.5$, and then adding the dispersion to an aqueous solution in which is dissolved the 3000-10.

A matrix type of multi-color liquid crystal display device was produced by following the same procedures as in Example 1, and substantially the same effects as those of Example 1 could be obtained. It was found, however, that dyes that produces light-fast color filters were limited to oil-soluble, metal complex salt dyes.

EXAMPLE 5

The composition of the electrodeposition bath in Example 1 was changed to the following composition:

| Materials | Weight ratio |
|---|---|
| S-Via ED-3000 | 20 |
| Water | 120 |
| Oil-soluble dye | x |

In this case, the bath is mixed by adding the oil-soluble dye to the S-Via ED-3000, in the range of $x<1.0$, and this in uniformly dispersed by kneading, ultrasonic waves or the like. Then the water is added to provide the electrodeposition bath. When a matrix type multi-color display device was produced in the same way as in Example 1, the same effect as those of Example 1 could be obtained. The oil-soluble dyes used in this example are not limited to those which are soluble in hydrophilic solvents but, needless to say, are preferably very light-fast.

As has been described concretely with reference to the above examples, the method of producing a matrix type multi-color display device in accordance with the present invention is simple and easy, and color filters can be produced without needing to provide special means for separating colors, such as resist printing, to realize a multi-color display. The color filters are rigid and free from pattern discrepancies. When combined with display materials such as a liquid crystal, the color filters of the invention provide a high display quality and reliability.

Moreover, any one of each drain, source and gate on the TFT substrate can be used as the electrode for the electrodeposition, the structure of the TFTs need not be changed drastically to effect the electrodeposition, and the color filters can be formed by electrodeposition so as to be positioned on the upper or lower layer of the driving electrodes.

What is claimed is:

1. A matrix type multi-color display device comprising: a matrix of display electrodes 13 each having a transistor 1 deposited on a first substrate 11; a first electrode 7 connected to one terminal of each transistor of each row of transistors and a second electrode 12 connected to another terminal of each transistor of each column of transistors; a counter electrode 5 deposited on a second substrate 6; display material 3 disposed between said matrix of display electrodes and said counter electrode; color filters 2 having different color tones each electrodeposited on said each display electrode 13 from a solution containing polymer and coloring matter by selectively applying voltages to said first and second electrodes so as to apply an electrodeposition voltage to selected display electrode.

2. A matrix type multi-color display device comprising: a matrix of transistors 1 deposited on a first substrate 11; a first electrode 7 connected to one terminal of each transistor of each row of transistors and a second electrode 12 connected to another terminal of each transistor of each column of transistors; a counter electrode 5 deposited on a second substrate 6; a matrix of conductive layers 15 each connected to said first electrode (FIG. 6) or second electrode (FIG. 7); color filters 2 having different color tones each electrodeposited on said each conductive layers 15 from a solution containing polymer and coloring matter by selectively applying a electrodeposition voltage to said first electrode or said second electrode; a matrix of display electrodes 13 each disposed on said each color filters 2 and each connected to further terminal of said transistor 1 and display material 3 disposed between said display electrodes and said counter electrode.

* * * * *